US012063493B2

(12) United States Patent
Ji et al.

(10) Patent No.: US 12,063,493 B2
(45) Date of Patent: Aug. 13, 2024

(54) DISPLAY DEVICE

(71) Applicant: BOE TECHNOLOGY GROUP CO., LTD., Beijing (CN)

(72) Inventors: Yaqian Ji, Beijing (CN); Jing Yu, Beijing (CN); Xiufeng Li, Beijing (CN); Yue Gou, Beijing (CN); Yanling Han, Beijing (CN); Peixiao Li, Beijing (CN); Lei Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 323 days.

(21) Appl. No.: 17/439,673

(22) PCT Filed: Jan. 5, 2021

(86) PCT No.: PCT/CN2021/070230

§ 371 (c)(1),
(2) Date: Sep. 15, 2021

(87) PCT Pub. No.: WO2022/147637

PCT Pub. Date: Jul. 14, 2022

(65) Prior Publication Data

US 2023/0092950 A1 Mar. 23, 2023

(51) Int. Cl.
*H04R 7/04* (2006.01)
*H04R 1/02* (2006.01)

(52) U.S. Cl.
CPC ............ *H04R 7/045* (2013.01); *H04R 1/028* (2013.01); *H04R 2499/15* (2013.01)

(58) Field of Classification Search
CPC ........ G06F 1/16; G06F 1/1605; G06F 1/1652; G02F 1/133308; H04R 1/02; H04R 1/028; H04R 2499/15; H04R 7/045
See application file for complete search history.

(56) References Cited

U.S. PATENT DOCUMENTS 7,292,702 B2 * 11/2007 Hagman ................ H04R 7/045 381/345
7,817,810 B2 * 10/2010 Cheung .................. H04R 31/00 244/119
9,182,787 B2 * 11/2015 Wu ........................ G06F 1/1656
9,818,805 B2 * 11/2017 Choi ...................... G06F 1/1688
(Continued)

FOREIGN PATENT DOCUMENTS

CN 107409257 A 11/2017
CN 107454519 A 12/2017
(Continued)

*Primary Examiner* — Rockshana D Chowdhury
*Assistant Examiner* — Martin Antonio Asmat Uceda
(74) *Attorney, Agent, or Firm* — Brooks Kushman P.C.

(57) ABSTRACT

A display device, including a display panel, a box, a connection frame and a vibration actuator provided on the display panel. The connection frame includes: a frame-shaped member including a first end face and a second end face arranged opposite to each other, the first end face being attached to a top face of the box, a plurality of protrusions being provided on the second end face, a surface of each protrusion away from the first end face forming a support face, and the display panel being fixed on the support face; and a connection member fixedly coupled to the frame-shaped member, and detachably coupled to the box via a fastener.

11 Claims, 3 Drawing Sheets

(56) References Cited

U.S. PATENT DOCUMENTS

| | | | | |
|---|---|---|---|---|
| 11,412,322 | B2 * | 8/2022 | Lee | H04R 1/028 |
| 2013/0021731 | A1 * | 1/2013 | Wu | G06F 1/1656<br>361/679.01 |
| 2016/0219353 | A1 | 7/2016 | Whitwell | |
| 2019/0131381 | A1 * | 5/2019 | Tang | H10K 59/18 |
| 2020/0160760 | A1 | 5/2020 | Park et al. | |
| 2020/0163233 | A1 * | 5/2020 | Brackley | H01L 25/0753 |
| 2020/0280796 | A1 * | 9/2020 | Lee | H04R 9/025 |
| 2020/0314551 | A1 | 10/2020 | Kim | |

FOREIGN PATENT DOCUMENTS

| | | | | |
|---|---|---|---|---|
| CN | 111199686 | A | 5/2020 | |
| CN | 210670535 | U | 6/2020 | |
| CN | 111491242 | A | 8/2020 | |
| CN | 111629305 | A | 9/2020 | |
| CN | 111754891 | A | 10/2020 | |
| CN | 112133191 | A * | 12/2020 | G09F 9/00 |

* cited by examiner

DISPLAY DEVICE

CROSS-REFERENCE TO RELATED APPLICATION

This application is the U.S. national phase of PCT Application No. PCT/CN2021/070230 filed on Jan. 5, 2021, which is incorporated herein by reference in its entirety.

TECHNICAL FIELD

The present disclosure relates to the field of display technology, in particular to a display device.

BACKGROUND

Through a sound-on-display technology, it is able for a display device to achieve the integration of sound and picture, utilize space effectively and save resources. In addition, when combined with a large-size screen, it is able to improve sounding power and achieve different sound field effects.

In the sound-on-display technology, an actuator needs to be attached onto a back surface of a display screen, and the display screen serves as a diaphragm of a loudspeaker. When the actuator vibrates, the screen vibrates too, so as to push an airflow to make a sound.

In addition, in order to make a sound through vibration, usually the display screen is fixed on a device box via an aluminum frame magnetically, and the display screen is bonded to the aluminum frame. When the sound is made through the display screen, the actuator vibrates to drive the display screen to vibrate up and down accordingly. However, during the vibration, compared with an elastic surface, a rigid surface of the display screen in contact with the aluminum frame has a greater stress and strain, so the sound has a poor linear characteristic and great distortion. In addition, when a vibration amplitude of the screen is relatively large and a vibration force exceeds a magnetic attraction force, the aluminum frame collides with the device box to produce an abnormal sound.

SUMMARY

An object of the present disclosure is to provide a display device, so as to solve the problem in the related art where a sound produced by a sound-on-display display device is distorted and abnormal.

The present disclosure provides in some embodiments a display device including a display panel, a box, a connection frame and a vibration actuator provided on the display panel. The connection frame includes: a frame-shaped member including a first end face and a second end face arranged opposite to each other, the first end face being attached to a top face of the box, a plurality of protrusions being provided on the second end face, a surface of each protrusion away from the first end face forming a support face, and the display panel being fixed on the support face; and a connection member fixedly coupled to the frame-shaped member, and detachably coupled to the box via a fastener.

In a possible embodiment of the present disclosure, the vibration actuator includes a vibration member and a fixation member, the vibration member is fixedly coupled to the display panel, and the fixation member is fixedly coupled to the connection member.

In a possible embodiment of the present disclosure, the connection member includes a first connection member extending inside the box in a direction away from the display panel, and a second connection member coupled to the first connection member and arranged parallel to the display panel. The connection member is detachably coupled to the box via the first connection member, and the fixation member is fixedly coupled to the second connection member.

In a possible embodiment of the present disclosure, two first connection members are provided at two opposite positions of the frame-shaped member respectively, and coupled to each other through the second connection member.

In a possible embodiment of the present disclosure, an orthogonal projection of each first connection member onto a plane where the second end face is located at least partially overlaps an orthogonal projection of a corresponding protrusion onto the plane where the second end face is located.

In a possible embodiment of the present disclosure, the frame-shaped member is formed by a plurality of bars connected in an end-to-end manner, and the first connection members are provided on two opposite bars or at opposite joints of two adjacent bars respectively.

In a possible embodiment of the present disclosure, when the first connection members are provided on two opposite bars respectively, each first connection member is fixedly coupled to an inner wall of the box, and when the first connection members are provided at the opposite joints of the adjacent bars respectively, each first connection member is fixedly coupled to two adjacent inner walls of the box.

In a possible embodiment of the present disclosure, an opening is formed in a bottom face of the box, a cover body coupled to the box is provided at the opening, and the cover body is switched between a first state where the cover body covers the opening and a second state where the cover body moves relative to the opening to expose the opening.

In a possible embodiment of the present disclosure, the display panel includes a plurality of spliced sub-panels, the quantity of the connection frames is plural, a frame-shaped member of each connection frame corresponds to one sub-panel, the sub-panel is provided on the support face formed by the plurality of protrusions of the corresponding frame-shaped member, and the frame-shaped members of the plurality of connection frames are spliced in sequence.

In a possible embodiment of the present disclosure, an elastic member is provided between two adjacent frame-shaped members, and the two adjacent frame-shaped members are fixedly coupled to each other via a connection bolt penetrating through the two adjacent frame-shaped members and the elastic member.

In a possible embodiment of the present disclosure, the connection member is coupled to the box through a bolt.

In a possible embodiment of the present disclosure, an axis of the bolt is perpendicular to the inner wall of the box.

In a possible embodiment of the present disclosure, the connection member is integrally coupled to the frame-shaped member.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In order to solve the problem in the related art where a sound produced by a sound-on-display display device is distorted and abnormal, the present disclosure provides in some embodiments a display device. Through reducing a contact area between a display panel and a supported frame-shaped member, it is able to provide the display panel with some free edges, and reduce a stress in the panel, thereby to prevent the occurrence of sound distortion when the sound is produced through vibration. In addition, a connection member of a connection frame is fixedly coupled to a box of the display device, so as to prevent the occurrence of the abnormal sound caused by the vibration of the connection frame relative to the box when the display panel vibrates.

Figure 1:
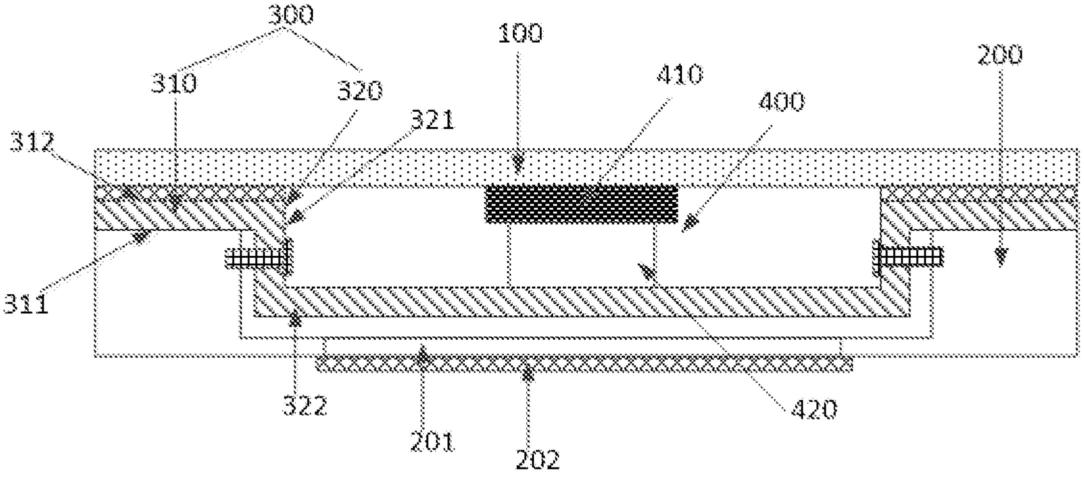
FIG. 1 is a sectional view of a display device according to one embodiment of the present disclosure.
Figure 2:
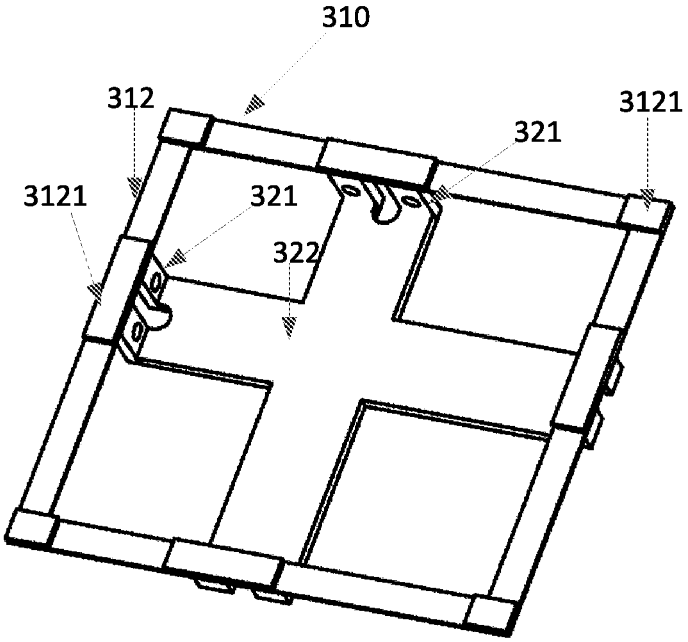
FIG. 2 is a solid view of a connection frame in the display device according to a first embodiment of the present disclosure.

FIG. 1 is a sectional view of a display device according to one embodiment of the present disclosure. As shown in FIG. 1 and FIG. 2, the display device includes a display panel 100, a box 200, a connection frame 300 and a vibration actuator 400 provided on the display panel 100. The connection frame 300 includes: a frame-shaped member 310, including a first end face 311 and a second end face 312 arranged opposite to each other, the first end face 311 being attached to a top face of the box 200, a plurality of protrusions 3121 being provided on the second end face 312, a surface of each protrusion 3121 away from the first end face 311 forming a support face, and the display panel 100 being fixed on the support face; and a connection member 320 fixedly coupled to the frame-shaped member 310, and detachably coupled to the box 200 via a fastener.

In the display device according to the embodiments of the present disclosure, the connection frame 300 is used for fixing the display panel 100 and the box 200, and it includes a frame-shaped member 310 and a connection member 320 which are coupled to each other. The frame-shaped member 310 is coupled between the display panel 100 and the box 200, with one end face (i.e., the first end face 311) being attached to the box 200, and the other end face ((i.e., the second end face 312) being fixedly coupled to the display panel 100. The connection member 320 is used for detachably coupling the connection frame 300 and the box 200.

The box 200 is used for mounting and supporting the display panel 100, and has an acoustics function to some extent, such as providing an acoustic back cavity via the box 200, so as to reduce low frequencies through a certain acoustic volume. In addition, through the box 200, it is able to prevent the occurrence of an acoustic short circuit due to the superposition of acoustic waves in front of and behind the vibration actuator.

In a possible embodiment of the present disclosure, the fastener between the box 200 and the connection member 320 is a locking bolt.

Based on the above-mentioned structure, the connection member 320 is detachably coupled to the box 200 via the fastener, so as to enable the connection member 320 and the box 200 to be relatively fixedly coupled to each other when the display panel 100 is arranged on the box 200, thereby to prevent the occurrence of the abnormal sound when the display panel vibrates and the connection frame 300 vibrates relative to the box. In addition, it is able to separate the display panel 100 from the box 200 after the display panel 100 has been fixedly coupled to the box 200, thereby to facilitate the maintenance. As compared with the related art where a magnetic attraction element is provided between the frame-shaped member and the box to detachably attach the display panel 100 to the box 200, in the embodiments of the present disclosure, it is able to prevent the occurrence of the abnormal sound when the display panel vibrates.

In addition, in the display device according to the embodiments of the present disclosure, a plurality of protrusions 3121 are provided on the end face (second end face 312) of the frame-shaped member 310 where the display panel 100 is mounted, so as to support the display panel 100. As compared with a situation where the display panel 100 is supported on an entire plane, it is able to reduce a contact area between the display panel and the frame 310, provide the display panel with some free edges, and reduce a stress in the panel, thereby to prevent the occurrence of sound distortion when the sound is produced through vibration.

In a possible embodiment of the present disclosure, an adhesive layer, such as a foam double-sided adhesive or rubber, is provided on the support face formed by the plurality of protrusions 3121, and the display panel 100 is fixed onto the frame-shaped member 310 through the adhesive layer. Furthermore, an optimal vibration damping property is provided between the display panel 100 and the frame-shaped member 310, so it is able to further reduce the stress in the panel during vibration and reduce the vibration transmission of the display panel to the frame-shaped member 310.

In a possible embodiment of the present disclosure, the frame 310 and the connection member 320 are integrally formed, and the connection frame 300 is made of aluminum.

Specifically, as shown in FIGS. 1 and 2, the frame-shaped member 310 is a hollowed-out frame consisting of a plurality of bars coupled to each other in an end-to-end manner. One end face (the second end face 312) is provided with the plurality of spaced protrusions 3121. A concave structure is formed between two adjacent protrusions 3121, and surfaces of the protrusions 3121 away from the other end face are located in the same plane, i.e., they together form a support face for mounting the display panel 100. The other end face (the first end face 311) is a flat face, and it is placed on, and attached to, the box 200.

The connection member 320 is coupled to the frame-shaped member 310 and extends away from the second end face 312 on the first end face 311.

As shown in FIG. 1, the connection member 320 extends towards in interior of the box 200. In a possible embodiment of the present disclosure, the fastener between the connection member 320 and the box 200 is a bolt which penetrates through the connection member 320 and the box 200 in a direction perpendicular to an inner wall face of the box 200, so as to enable the connection member 320 to be fixedly coupled to the box 200.

In order to ensure a stable connection between the connection member 320 and the box 200, in a possible embodiment of the present disclosure, the connection members 320 are provided inside the box 200 at opposite positions, so as to allow the bolt to penetrate therethrough to fix the connection member 320 and the box 200.

In a possible embodiment of the present disclosure, as shown in FIG. 1, the vibration actuator 400 includes a vibration member 410 and a fixation member 420. The vibration member 410 is fixedly coupled to the display panel 100, and the fixation member 420 is fixedly coupled to the connection member 320.

During the implementation, the fixation member 420 of the vibration actuator 400 is mounted on the connection member 320. As compared with a situation where the fixation member 420 is mounted on the box 200, at this time the fixation member 420 is in a suspended state. A structural mode is related to structural mass, and as compared with a situation where the fixation member is fixed onto the display panel 100, the mass increases when the fixation member is in the suspended state, so it is able to change a vibration mode of a display assembly. In addition, sound radiation efficiency is inversely proportional to a surface density. The smaller the surface density, the higher the radiation efficiency. Through the fixation member in the suspended state, it is able to reduce the surface density of the sounding structure consisting of the display panel and the vibration actuator, thereby to enhance the frequency response of the display panel 100 at medium and high frequencies when the display panel 100 vibrates.

In a possible embodiment of the present disclosure, as shown in FIGS. 1 and 2, the connection member 320 includes a first connection member 321 extending inside the box 200 in a direction away from the display panel 100, and a second connection member 322 coupled to the first connection member 321 and arranged parallel to the display panel 100. The connection member 320 is detachably coupled to the box 200 through the first connection member 321.

During the implementation, the fixation member 420 of the vibration actuator 400 is fixedly coupled to the second connection member 322.

In a possible embodiment of the present disclosure, as shown in FIGS. 2 to 5, two first connection members 321 are provided at two opposite positions of the frame-shaped member 310 respectively, and coupled to each other through the second connection member 322.

Specifically, each of the first connection members 321 is detachably coupled to the box 200 through the fastener.

During the implementation, the second connection member 322 is provided between the display panel 100 and the box 200. In order to enable the box 200 to function as the acoustic back cavity, an area of an orthogonal projection of the second connection member 322 onto the display panel 100 is smaller than an area of an orthogonal projection of a hollowed-out portion of the frame-shaped member 310 onto the display panel 100, i.e., the second connection member 322 does not cover the whole hollowed-out portion of the frame-shaped member 310. There is a communication path between the display panel 100 and a bottom face of the box 200.

In a possible embodiment of the present disclosure, the second connection member 322 is arranged parallel to the display panel 100.

During the implementation, the frame-shaped member 310 consists of a plurality of bars coupled to each other in an end-to-end manner, and the first connection members 321 are provided on two opposite bars or at opposite joints of two adjacent bars respectively.

In a possible embodiment of the present disclosure, as shown in FIG. 2, the first connection members 321 are provided at the opposite positions of two opposite bars of four bars in the frame-shaped member 310. The second connection members 322 are arranged between the display panel 100 and the box 200 in a cross-shaped manner, and each end of the second connection member 322 is coupled to one first connecting member 321.

Figure 3:
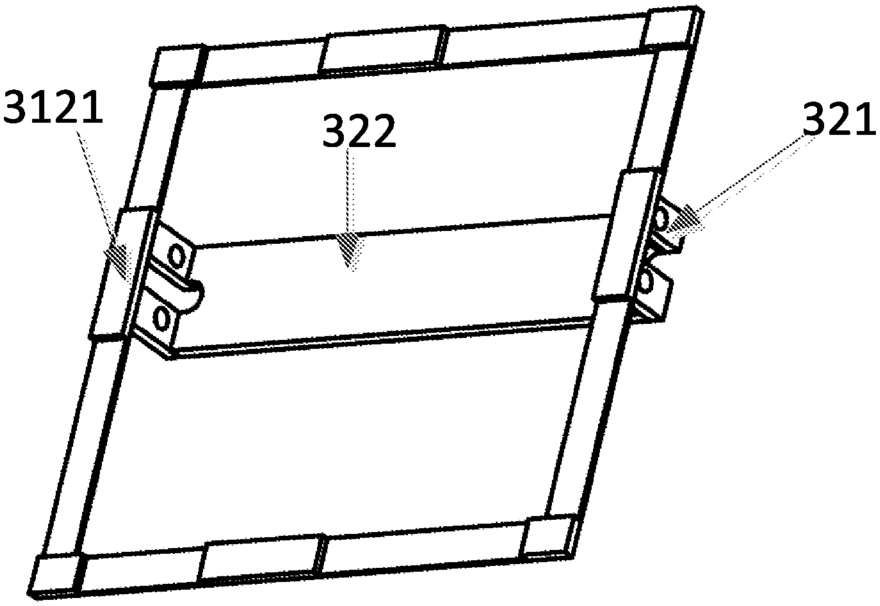
FIG. 3 is a solid view of the connection frame in the display device according to a second embodiment of the present disclosure.

In a possible embodiment of the present disclosure, as shown in FIG. 3, the first connection members 321 are provided at opposite positions of two opposite bars of the four bars in the frame-shaped member 310. The second connection member 322 is provided in a bar shape between the display panel 100 and the box 200, and each end of the second connection member 322 is coupled to one first connection member 321.

In the embodiments of the present disclosure, the first connection members 321 is fixedly coupled to the box 200 via one or more bolts.

Figure 4:
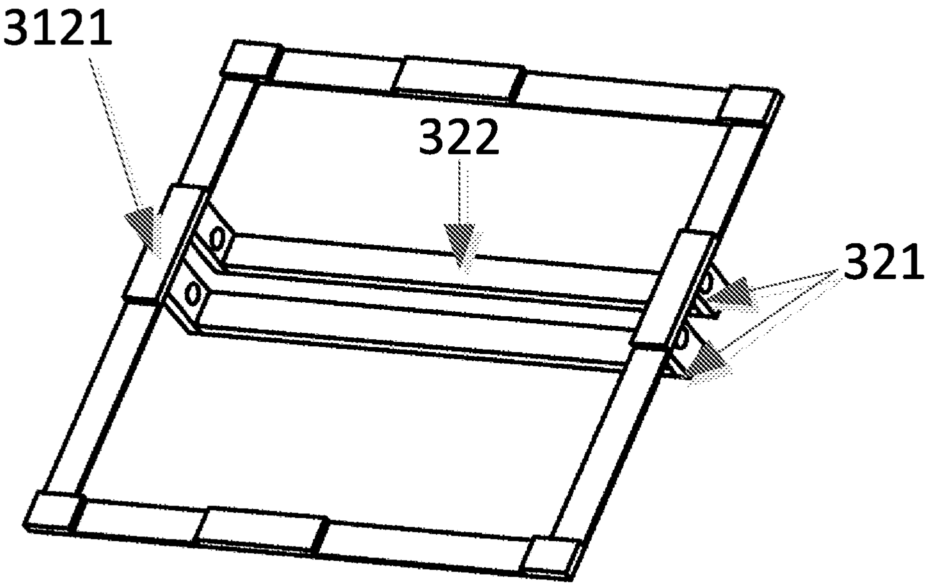
FIG. 4 is a solid view of the connection frame in the display device according to a third embodiment of the present disclosure.

In another possible embodiment of the present disclosure, as shown in FIG. 4, four first connection members 321 are provided at the opposite positions of two opposite bars of four bars in the frame-shaped member 310, so as to form two pairs of opposite first connection members 321. The quantity of the second connection members 322 is two, and the two second connection members 322 are both strip-shaped and arranged parallel to each other. Two ends of each second connection member 322 are coupled to one pair of opposite first connection members 321 respectively.

In FIGS. 2 to 4, the first connection member 321 is fixedly coupled to one of the inner walls of the box 200.

Figure 5:
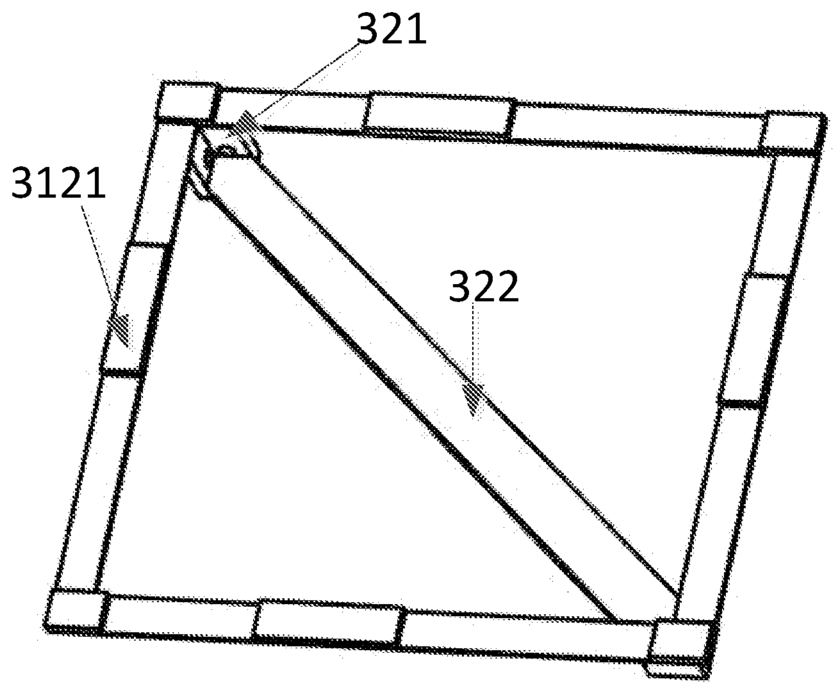
FIG. 5 is a solid view of the connection frame in the display device according to a fourth embodiment of the present disclosure.

In a possible embodiment of the present disclosure, as shown in FIG. 5, the first connection member 321 is provided at the joint of two adjacent bars of the four bars in the frame-shaped member 310. Specifically, two first connection members 321 are provided at two opposite joints respectively, i.e., at two diagonal positions of the frame-shaped member 310. The second connection member 322 is provided in a strip shape between the display panel 100 and the box 200, and each end of the second connection member 322 is coupled to one first connection member 321.

During the implementation, each first connection member 321 includes two portions perpendicular to each other, so as to insert the bolts in such a manner as to be perpendicular to each other, thereby to enable each first connection member 321 to be fixedly coupled to two adjacent inner walls of the box 200.

In the above-mentioned display device according to the embodiments of the present disclosure, referring to FIG. 1, the fixation member 420 of the vibration actuator 400 is mounted on a surface of the second connection member 322 facing the display panel 100. In a possible embodiment of the present disclosure, the fixation member 420 is fixed onto the second connection member 322 through an adhesive.

In a possible embodiment of the present disclosure, an orthogonal projection of each first connection member 321 onto a plane where the second end face 312 is located at least partially overlaps an orthogonal projection of a corresponding protrusion onto the plane where the second end face 312 is located, so as to provide the frame-shaped member 310 with a sufficient strength at a position where the first connecting member 321 is coupled to the box 200, thereby to enable the frame-shaped member 310 to be coupled to the box 200 stably.

In a possible embodiment of the present disclosure, as shown in FIG. 1, an opening 201 is form in a bottom face of the box 200, a cover body 202 coupled to the box 200 is provided at the opening 201, and the cover body 202 is switched between a first state where the cover body 202 covers the opening 201 and a second state where the cover body 202 moves relative to the opening 201 to expose the opening 201.

Through the opening 201 in the bottom face of the box 200, when the display panel 100 needs to be maintained, the cover body 202 is opened to expose the opening 201, and then the bolts for coupling the box 200 and the first connection member 321 are removed, so as to enable the connection frame 300 together with the display panel 100 to be separated from the box 200, thereby to facilitate the maintenance.

Figure 6:
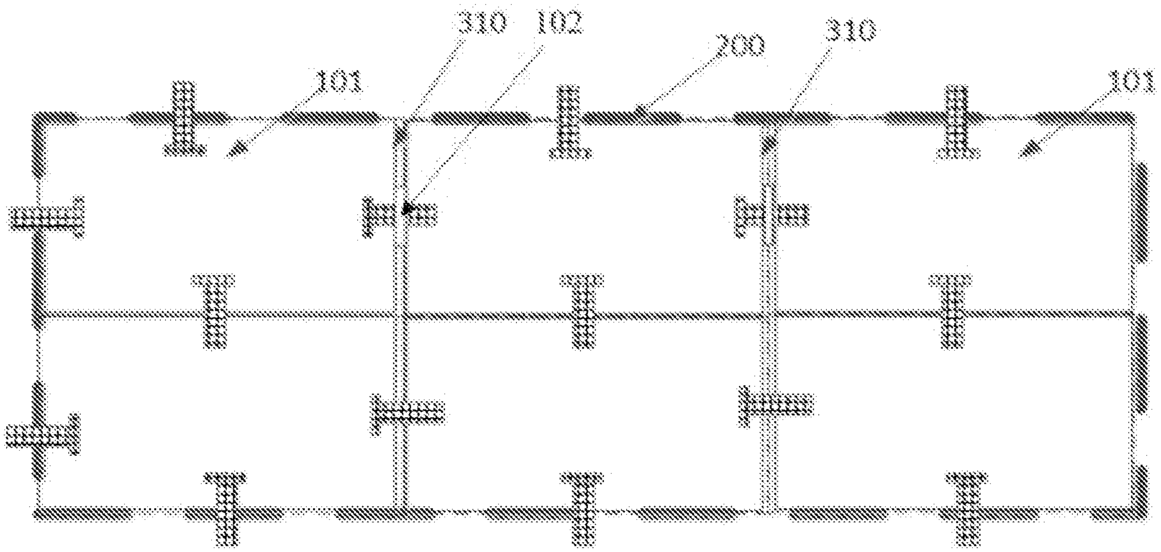
FIG. 6 is a planar view of a display panel including a plurality of sub-panels in the display device according to one embodiment of the present disclosure.

In a possible embodiment of the present disclosure, as shown in FIGS. 1 and 6, the display panel 100 includes a plurality of spliced sub-panels 101, the quantity of the connection frames 300 is plural, a frame-shaped member 310 of each connection frame 300 corresponds to one sub-panel 101, the sub-panel 101 is provided on the support face formed by the plurality of protrusions of the corresponding frame-shaped member 310, and the frame-shaped members of the plurality of connection frames 300 are spliced in sequence.

During the implementation, the display panel 100 including the plurality of spliced sub-panels 101 is fixed on the box 200, one vibration actuator is arranged on each sub-panel 101, and each sub-panel 101 is fixedly coupled to one connection frame 300. As shown in FIG. 6, the frame-shaped members 310 of the connection frame 300 are spliced on the top face of the box 200. A portion of the connection frame 300 at an edge of the box 200 is fixedly coupled to the box 200 through the connection member 320, and two adjacent bars of two adjacent frame-shaped members 310 are fixedly coupled to each other through a bolt.

In a possible embodiment of the present disclosure, an elastic member 102 is provided between two adjacent frame-shaped members 310, and the two adjacent frame-shaped members 310 are fixedly coupled to each other via a connection bolt penetrating through the two adjacent frame-shaped members 310 and the elastic member 102.

In a possible embodiment of the present disclosure, the elastic member 102 is an elastic nut or elastic vibration dampening pad, so as to relieve the vibration transmission between two adjacent frame-shaped members 310.

During the implementation, the structure of each connection frame 300 is the same as those in FIGS. 2 to 5, and thus will not be particularly defined herein.

According to the display device in the embodiments of the present disclosure, through the connection frame, it is able to mount and fix the fixation member of the vibration actuator and facilitate the maintenance of the display device. In addition, the connection frame is fixedly coupled to the box through the fastener, and the display panel is supported by the plurality of protrusions, so it is able to prevent the occurrence of the abnormal source when the connection frame vibrates relative to the box, and reduce a stress in the panel, thereby to prevent the occurrence of sound distortion, reduce a low-frequency cut-off frequency, and enlarge an active frequency range.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display device, comprising a display panel, a box, a connection frame, and a vibration actuator provided on the display panel, wherein the connection frame comprises:

a frame member comprising a first end face and a second end face arranged opposite to each other, the first end face being attached to a top face of the box, a plurality of protrusions being provided on the second end face, a surface of each protrusion away from the first end face forming a support face, and the display panel being fixed on the support face; and a connection member fixedly coupled to the frame member, and detachably coupled to the box via a fastener;

wherein the vibration actuator comprises a vibration member and a fixation member, the vibration member is fixedly coupled to the display panel, and the fixation member is fixedly coupled to the connection member;

wherein the connection member comprises a first connection member extending inside the box in a direction away from the display panel, and a second connection member coupled to the first connection member and arranged parallel to the display panel, wherein the connection member is detachably coupled to the box via the first connection member, and the fixation member is fixedly coupled to the second connection member;

an area of an orthogonal projection of the second connection member onto the display panel is smaller than an area of an orthogonal projection of a hollowed-out portion of the frame member onto the display panel, the second connection member does not cover the whole hollowed-out portion of the frame member;

wherein an opening is formed in the bottom face of the box, a cover body coupled to the box is provided at the opening, and the cover body is switched between a first state where the cover body covers the opening and a second state where the cover body moves relative to the opening to expose the opening.

2. The display device according to claim 1, wherein two first connection members are provided at two opposite positions of the frame member respectively, and coupled to each other through the second connection member.

3. The display device according to claim 1, wherein an orthogonal projection of each first connection member onto a plane where the second end face is located at least partially overlaps an orthogonal projection of a corresponding protrusion onto the plane where the second end face is located.

4. The display device according to claim 2, wherein the frame member is formed by a plurality of bars connected in an end-to-end manner, and the first connection members are provided on two opposite bars or at opposite joints of two adjacent bars respectively.

5. The display device according to claim 4, wherein when the first connection members are provided on two opposite bars respectively, each first connection member is fixedly coupled to an inner wall of the box, and when the first connection members are provided at the opposite joints of the adjacent bars respectively, each first connection member is fixedly coupled to two adjacent inner walls of the box.

6. The display device according to claim 1, wherein the display panel comprises a plurality of spliced sub-panels, the quantity of the connection frames is plural, a frame member of each connection frame corresponds to one sub-panel, the sub-panel is provided on the support face formed by the plurality of protrusions of the corresponding frame member, and the frame members of the plurality of connection frames are spliced to adjacent frame members.

7. The display device according to claim 6, wherein an elastic member is provided between two adjacent frame members, and the two adjacent frame members are fixedly coupled to each other via a connection bolt penetrating through the two adjacent frame members and the elastic member.

8. The display device according to claim 1, wherein the connection member is coupled to the box through a bolt.

9. The display device according to claim 8, wherein an axis of the bolt is perpendicular to the inner wall of the box.

10. The display device according to claim 1, wherein the connection member is integrally coupled to the frame member.

11. The display device according to claim 2, wherein an orthogonal projection of each first connection member onto a plane where the second end face is located at least partially overlaps an orthogonal projection of a corresponding protrusion onto the plane where the second end face is located.

* * * * *